United States Patent [19]
Barsoum et al.

[11] Patent Number: 6,075,795
[45] Date of Patent: Jun. 13, 2000

[54] COLLISION DETECTION SYSTEM FOR MULTIPLE STATIONS IN DISCRETE MULTI-TONE DATA COMMUNICATIONS NETWORK

[75] Inventors: Maged F. Barsoum, Sunnyvale; Chien-Meen Hwang, San Jose; Hungming Chang, Cupertino; Muoi V. Huynh; Eugen Gershon, both of San Jose, all of Calif.

[73] Assignee: Advanced Micro Devices, Inc., Sunnyvale, Calif.

[21] Appl. No.: 09/286,994

[22] Filed: Apr. 7, 1999

[51] Int. Cl.[7] ..................................................... H04J 3/24
[52] U.S. Cl. ........................................... 370/445; 370/447
[58] Field of Search ................................... 370/445, 447, 370/448, 324, 341, 210, 499, 495, 446; 340/825.5

[56] References Cited

U.S. PATENT DOCUMENTS

| | | | |
|---|---|---|---|
| 4,885,743 | 12/1989 | Helbers et al. | 370/445 |
| 5,012,467 | 4/1991 | Crane | 370/445 |
| 5,657,326 | 8/1997 | Burns et al. | 370/445 |

Primary Examiner—Salvatore Cangialosi

[57] ABSTRACT

A novel collision detecting method is provided at the physical layer for use in a multi-point DMT communication network having stations transmitting over common media. The method includes generating a collision code corresponding to ID information of a station. A collision symbol representing the collision code is transmitted at the beginning of a portion of a random access data communication. A station in the network receives the collision symbol and decodes a collision signal carried by the collision symbol. A collision event is detected if the collision signal does not satisfy pre-set requirements. For example, energy of each component of the collision signal may be compared with a predetermined minimum energy level to generate a code element for each component having energy exceeding the predetermined minimum energy level. Validity of the code having the generated code elements is determined based on a predetermined validity criterion. Also, the distance in frequency domain between components of the collision signal corresponding to the generated code elements is compared with a predetermined minimum distance in frequency domain, to confirm validity of the detected code.

20 Claims, 6 Drawing Sheets

| ID | | | | $C_i$ (i=0...15) | | | | | | $B_i$ |
|---|---|---|---|---|---|---|---|---|---|---|
| 0 | 0 | 0 | 0 | 1 | 1 | 1 | 0 | 0 | 0 | $\{b_1, b_2, b_3\}$ |
| 0 | 0 | 0 | 1 | 0 | 1 | 1 | 1 | 0 | 0 | $\{b_2, b_3, b_4\}$ |
| 0 | 0 | 1 | 0 | 0 | 0 | 1 | 1 | 1 | 0 | $\{b_3, b_4, b_5\}$ |
| 0 | 0 | 1 | 1 | 0 | 0 | 0 | 1 | 1 | 1 | $\{b_4, b_5, b_6\}$ |
| 0 | 1 | 0 | 0 | 1 | 0 | 1 | 1 | 0 | 0 | $\{b_1, b_3, b_4\}$ |
| 0 | 1 | 0 | 1 | 1 | 0 | 0 | 1 | 1 | 0 | $\{b_1, b_4, b_5\}$ |
| 0 | 1 | 1 | 0 | 1 | 0 | 0 | 0 | 1 | 1 | $\{b_1, b_5, b_6\}$ |
| 0 | 1 | 1 | 1 | 1 | 1 | 0 | 1 | 0 | 0 | $\{b_1, b_2, b_4\}$ |
| 1 | 0 | 0 | 0 | 1 | 1 | 0 | 0 | 1 | 0 | $\{b_1, b_2, b_5\}$ |
| 1 | 0 | 0 | 1 | 1 | 1 | 0 | 0 | 0 | 1 | $\{b_1, b_2, b_6\}$ |
| 1 | 0 | 1 | 0 | 0 | 1 | 0 | 1 | 1 | 0 | $\{b_2, b_4, b_5\}$ |
| 1 | 0 | 1 | 1 | 0 | 1 | 0 | 0 | 1 | 1 | $\{b_2, b_5, b_6\}$ |
| 1 | 1 | 0 | 0 | 0 | 0 | 1 | 0 | 1 | 1 | $\{b_3, b_5, b_6\}$ |
| 1 | 1 | 0 | 1 | 0 | 1 | 0 | 1 | 0 | 1 | $\{b_2, b_4, b_6\}$ |
| 1 | 1 | 1 | 0 | 1 | 0 | 1 | 0 | 1 | 0 | $\{b_1, b_3, b_5\}$ |
| 1 | 1 | 1 | 1 | 0 | 1 | 1 | 0 | 1 | 0 | $\{b_2, b_3, b_5\}$ |

FIG. 5

COLLISION DETECTION SYSTEM FOR MULTIPLE STATIONS IN DISCRETE MULTI-TONE DATA COMMUNICATIONS NETWORK

FIELD OF THE INVENTION

The present invention relates to data communications, and more particularly, to a collision detection scheme in a discrete multi-tone (DMT) data communications network, for example network for communications between multiple devices coupled to existing wiring, such as twisted pair telephone wiring in the user's residence.

BACKGROUND ART

Modern society continues to create exponentially increasing demands for digital information and the communication of such information between data devices. Local area networks use a network, cable or other media to link stations on the network for exchange of information in the form of packets of digital data. A typical local area network architecture uses a media access control (MAC) enabling network interface cards at each station to share access to the media. Most conventional local area network architectures use media access controllers operating according to half-duplex or full-duplex Ethernet (ANSI/IEEE standard 802.3) protocol and a prescribed network medium, such as a twisted pair cable.

These architectures have proven quite successful in providing data communications in commercial applications. However, these common local area network architectures require installation of specialized wiring and use of specific wiring topologies. For example, the most popular network protocols, such as Ethernet, require special rules for the wiring, for example with regard to quality of wire, range of transmission and termination.

Due to the success of the Internet and the rapid decreases in the prices of personal computers and associated data equipment, a demand has arisen for data communications between a limited number of devices within relatively small premises, typically a residence or small business. While existing local area networks can serve the purpose, in such installations, the cost of installing physical network wiring satisfying the rules for the particular protocol can be prohibitively expensive.

Most existing buildings, including residences, include some existing wiring, for phones, electrical power and the like. Proposals have been made to communicate data using such existing infrastructure. This reduces the costs of wiring for the network, but the existing wiring raises a variety of issues regarding transport of high-speed digital signals.

For example, efforts are underway to develop an architecture that enables computers to be linked together using conventional twisted pair telephone lines. Such an arrangement, referred to herein as a home network environment, provides the advantage that existing telephone wiring in a home may be used to implement a home network environment without incurring costs for substantial new wiring installation. However, any such network must deal with issues relating to the specific nature of in-home telephone wiring, such as operation over a media shared with other services without interference from or interfering with the other services, irregular topology, and noise. With respect to the noise issue, every device on the telephone line may be a thermal noise source, and the wiring may act much like an antenna to pick up disruptive radio signal noise. Telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard telephones coupled to the lines, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

At the same time a number of XDSL technologies are being developed and are in early stages of deployment, for providing substantially higher rates of data communication over twisted pair telephone wiring of the telephone network. XDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

Consider ADSL as a representative example. For an ADSL based service, the user's telephone network carrier installs one ADSL modem unit at the network end of the user's existing twisted-pair copper telephone wiring. Typically, this modem is installed in the serving central office or in the remote terminal of a digital loop carrier system. The user obtains a compatible ADSL modem and connects that modem to the customer premises end of the telephone wiring. The user's computer connects to the modem. The central office modem is sometimes referred to as an ADSL Terminal Unit—Central Office or 'ATU-C'. The customer premises modem is sometimes referred to as an ADSL Terminal Unit—Remote or 'ATU-R'. The ADSL user's normal telephone equipment also connects to the line through a frequency combiner/splitter, which is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Two techniques are under development for dividing the usable bandwidth of the telephone line to provide these channels. One approach uses Echo Cancellation. Currently, the most common approach is to divide the usable bandwidth of a twisted wire pair telephone line by frequency, that is to say by Frequency Division Multiplexing (FDM).

FDM uses one frequency band for upstream data and another frequency band for downstream data. The downstream path is then divided by time division multiplexing into one or more high-speed channels and one or more low speed channels. The upstream path also may be time-division multiplexed into corresponding low speed channels.

The FDM data transport for ADSL services utilizes discrete multi-tone (DMT) technology. A DMT signal is basically the sum of N independently QAM modulated signals, each carried over a distinct carrier frequency channel. The frequency separation of each carrier is 4.3125 kHz with a total number of 256 carriers or tones (ANSI). An asymmetrical implementation of this 256 tone-carrier DMT coding scheme might use tones 32–255 to provide a downstream channel of approximately 1 MHz analog bandwidth. In such an implementation, tones 8–31 are used as carriers to provide an upstream channel of approximately 100 kHz analog bandwidth. Each tone is quadrature amplitude modulated (QAM) to carry up to 15 bits of data on each cycle of the tone waveform.

The existing DSL systems provide effective high-speed data communications over twisted pair wiring between customer premises and corresponding network-side units, for example located at a central office of the telephone network. The DSL modem units overcome many of the problems involved in data communication over twisted pair wiring. However, for a number of reasons, the existing DSL units are not suitable to providing local area network type communications within a customer's premises. For example, existing ADSL units are designed for point-to-point communication. That is to say, one ATU-R at the residence communicates with one ATU-C unit on the network end of the customer's line. There is no way to use the units for multi-point communications. Also, the existing ADSL modems tend to be quite complex, and therefore are too expensive for in-home communications between multiple data devices of one customer.

A need therefore still exists for techniques to adapt DMT type DSL communications for use over existing in-home wiring. The adaptations should enable multi-point communications. Also, many of the problems overcome by complex methodologies in ADSL communications need corresponding simpler, more cost effective solutions for in-home networking.

Unlike the point-to-point implementations where communications are always ongoing and enable virtually continuous synchronization between transmitter and receiver, the random access type devices only send when they have data to send. As various transmission devices may try to use a shared transmission medium simultaneously, it would be desirable to create an effective collision handling scheme.

Due to the nature of communications over existing wiring, it is difficult to physically detect a collision event when multiple devices transmit data packets at the same time. A typical communications protocol requires each packet transmission to be acknowledged by the receiver. In response to a received data packet, the receiver transmits an acknowledgement (ACK) signal, which indicates to the original transmitter that the data packet was received without errors. Accordingly, the transmitter assumes that no significant collision event happened during the data packet transmission. If the ACK signal is not received, the transmitter assumes that channel impairments cause the data packet to be lost.

A collision event caused by multiple stations competing for a shared network usually occurs at the beginning of transmission. Because the Medium Access Protocol indicates to stations on the network that the medium is free at approximately the same time, any stations with pending transmissions will begin to transmit at approximately the same time. When this occurs, the resulting transmissions will have a collision event that physically begins at or near the beginning of the transmission. However, the transmitting device is unaware of the occurrence of the collision until it has completed its attempt to transmit the data packet, and does not receive the expected ACK signal.

Thus, the collision event cannot be detected until the end of the transmission attempt. The longer the data packet, the longer it will take for the transmitting station to determine that the collision event has occurred.

Furthermore, if a collision event occurs at or near the beginning of a long data packet, most protocols and physical implementations render the entire data packet unreceivable. Therefore, the portion of the data packet after the beginning of the collision event wastes network bandwidth. The sooner a collision can be detected by a transmitter, the sooner the transmitter can end the faulted transmission and stop wasting network bandwidth.

Therefore, it would be desirable to provide a collision detecting scheme that would detect a collision event at the beginning of the transmission.

SUMMARY OF THE INVENTION

The present invention overcomes the noted problems involved in data networking and satisfies the above stated needs by providing a novel collision detecting method, at the physical layer, for use in a multi-point DMT communication network having stations transmitting over common media. The method comprises generating a collision code corresponding to identification (ID) information of a station. A collision symbol representing the collision code is transmitted at the beginning of a portion of a random access data communication. A station in the network receives the collision symbol and decodes a collision signal carried by the collision symbol. A collision event is detected if the collision signal does not satisfy pre-set requirements.

In accordance with one aspect of the invention, energy of each component of the collision signal may be compared with a predetermined minimum energy level to generate a code element at a first logic level for each component having energy exceeding the predetermined minimum energy level. Validity of the code having the generated code elements is determined based on a predetermined validity criterion. For example, the collision code may have a predetermined number of the code elements at the first logic level. In this case, the validity of the detected code may be determined based on counting of the number of the code elements at the first logic level.

In accordance with another aspect of the invention, the distance in frequency domain between components of the collision signal corresponding to the generated code elements at the first logic level, is compared with a predetermined minimum distance in frequency domain, to confirm validity of the detected code. A no collision condition indicating than no collision exists may be detected if the generated code is valid based on the predetermined validity criterion, and the distance in frequency domain between components of the collision signal corresponding to the generated code elements at the first logic level is less than the predetermined minimum distance in frequency domain.

In accordance with a further aspect of the invention, the collision code may be described by a first descriptor including a set of descriptor elements indicating positions of code elements at a first logic level. The generated collision code may satisfy the following conditions. A first set of descriptor elements describing a first collision code may not be a subset of a second set of descriptor elements describing a second collision code. Also, a collision code may have a predetermined maximum number of adjacent elements at a second logic level.

The collision detection method of the present invention may be implemented in a discrete multi-tone (DMT) communication station for use on an analog link carrying modulated digital data. The station comprises a collision code generator for generating a collision code corresponding to ID information of the station, a DMT modulator for producing a DMT collision symbol representing the collision code, a DMT demodulator for demodulating the DMT collision symbol received from the link to produce a collision signal, and a collision detector responsive to the collision signal for detecting a collision event if the collision signal does not satisfy pre-set requirements.

In accordance with a preferred embodiment of the invention, the collision detector may comprise a slicer responsive to the collision signal for comparing energy of each component of the collision signal with a predetermined minimum energy level to generate a code element at a first logic level for each component having energy exceeding the predetermined minimum energy level. A validity detector may be coupled to the slicer for determining validity of the code having the code elements generated by the slicer, based on a predetermined validity criterion. For example, the validity detector may determine validity of the detected code by counting the number of the code elements at the first logic level.

Also, the collision detector may comprise a frequency-domain distance detector for comparing distance in frequency domain between components of the collision signal corresponding to the generated code elements at the first logic level, with a predetermined minimum distance in frequency domain, to confirm validity of the detected code. The collision detector detects that no collision exists if the generated code is valid based on the predetermined validity criterion, and the distance in frequency domain between components of the collision signal corresponding to the generated code elements at the first logic level is less than the predetermined minimum distance in frequency domain.

Still other aspects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 5 is a diagram illustrating mapping by an ID constellation points generator of the present invention.

BEST MODE FOR CARRYING OUT THE INVENTION

Although the invention has general applicability in the field of data communications, the best mode for practicing the invention is based in part on the realization of a collision detection scheme in a discrete multi-tone (DMT) data communications network for communications between multiple devices coupled to existing wiring, for example twisted pair telephone wiring in the user's residence.

Figure 1:
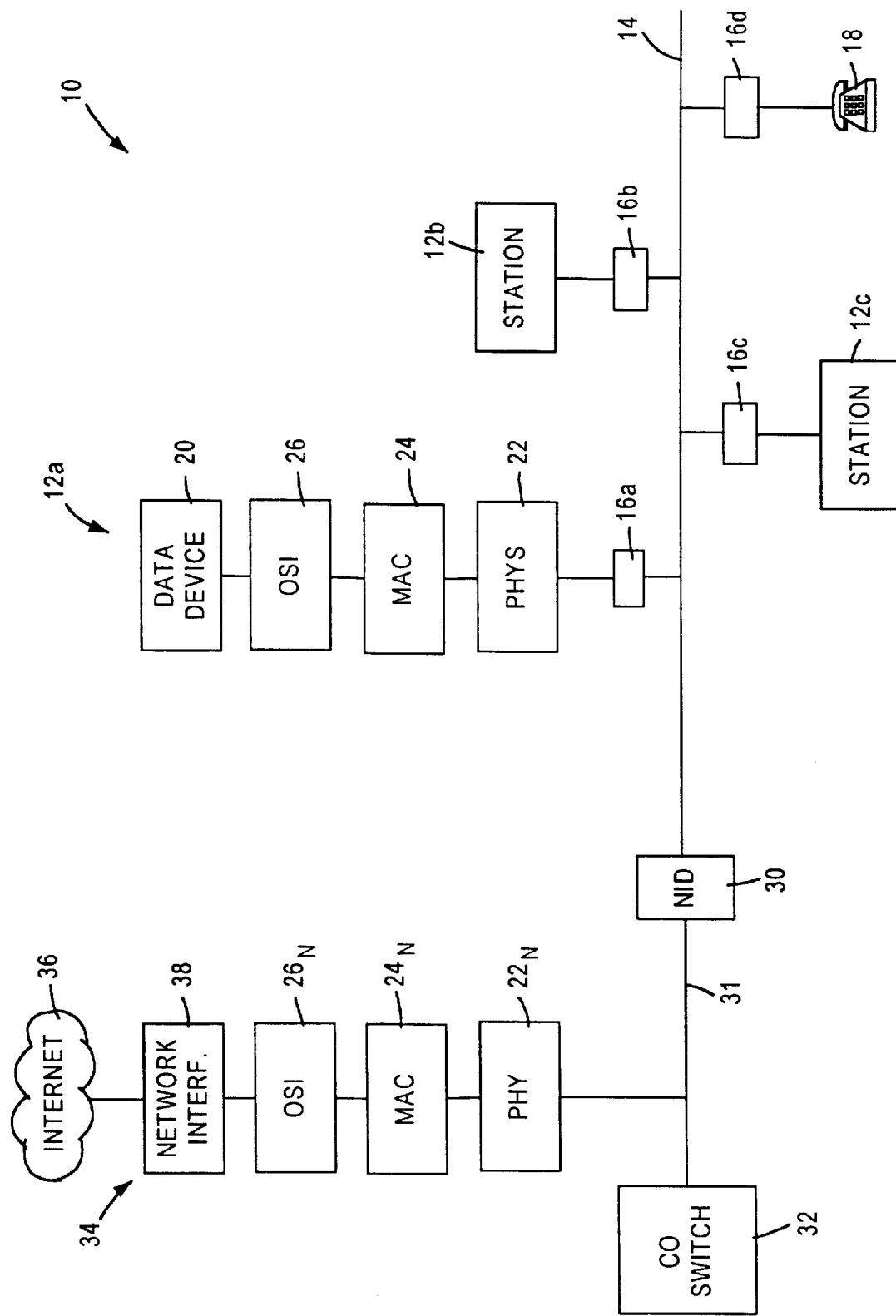
FIG. 1 is a diagram of an exemplary home local area network, in which the present invention may be implemented.

FIG. 1 is a diagram of a local area network 10 implemented in a home or similar customer premises environment using network media 14 according to an embodiment of the invention. The network may use a variety of different physical lines for the network media 14, such as coaxial cable, multi-pair cables, electrical power line wire, optical fiber or RF wireless communication links. In the preferred embodiment, the media 14 comprises twisted pair telephone wiring, commonly available in the home or office. As shown, the network 10 includes network stations 12a, 12b and 12c that are connected to a telephone line (twisted pair) wiring 14, via RJ-11 phone jacks 16a, 16b and 16c respectively. A telephone 18 connected to the RJ-11 phone jack 16d may continue to make phone calls while one or more of the stations 12 are communicating data.

As illustrated in more detail with respect to exemplary first station 12a in FIG. 1, each home network station 12 comprises a data device 20, for example a personal computer, printer, or intelligent consumer electronics device. Each station 12 also includes a physical layer (PHY) transceiver 22, a media access (MAC) layer 24, and an operating system (OS) layer 26 that performs higher layer functions according to the OSI reference model. In the inventive network, the PHY transceiver utilizes digital signal processing techniques to implement discrete multi-tone transport of digital data over the telephone wiring 14.

The stations 12 communicate by transmitting network data modulated into the analog network signals in accord with the invention. In particular, the physical layer transmitter transmits timing signals, modulated control and collision information, and packets comprising discrete multi-tone (DMT) symbols carrying the actual digital communication data. The physical layer receiver receives and processes these signals and demodulates the DMT symbols to recover the data. In accord with the invention, each random access begins with transmission of a timing mark, and the transmission of each packet of data begins with transmission of a timing mark. Signal processing in the receiver is based on recovery of timing from detection of the timing mark.

The network 10 is envisioned as a home network, and in many installations, the network 10 will provide random access to the local area network media 14 for data communications between the stations 12 within the customer premises. However, it is within the scope of the invention to utilize the DMT-based data communications to access external networks. Normally, the customer premises wiring 14 connects through a network interface device (NID) 30 to a subscriber's telephone line 31. The line 31, in turn connects to a central office (CO) switch 32 of the public switched telephone network. The switch 32 provides normal voice-grade telephone services, for example for communications using the telephone 18.

However, the line 31 may also transport DMT signals at appropriate frequencies for access to another network. In such an installation, the telephone network operator or another service provider would have a digital terminal unit 34 coupled to the subscriber's telephone line 31. The device 34 provides access to an external wide area data network, for example using ATM or SMDS to gain access to the public packet switched data network commonly referred to as the Internet. The digital terminal unit 34 includes a physical layer (PHY) transceiver $22_N$, a media access (MAC) layer $24_N$, and an operating system (OS) layer $26_N$ that perform functions similar to the transceiver 22, the MAC 24 and the OSI 26 in each of the home stations 12. In the terminal 34, however, the data device takes the form of a network interface 38 for providing the appropriate interface to the physical transport media of the higher level data network 36.

The DMT transmitters and receivers in the DMT PHY transceivers 22 utilize digital signal processors, to generate and/or demodulate complex analog waveforms carrying bits of data modulated onto individual tones within the available bandwidth. For example, the transmitter generates a DMT symbol by generating a predetermined number of samples through a digital to analog converter to produce the analog waveform of the symbol, having the mathematical properties necessary to represent the data carried by the symbol. Similarly, the receiver samples a received waveform and processes the time-domain values of the samples. This processing derives frequency-domain data and then detects the data bits transported on each tone contained within the symbol.

A shared-use link, with random access to the link by the various devices on the link, such as that shown in FIG. 1 presents a number of issues relating to the detection of a collision when several stations in the network try to transmit data simultaneously. The present invention addresses these issues using a collision detection system.

Figure 2:
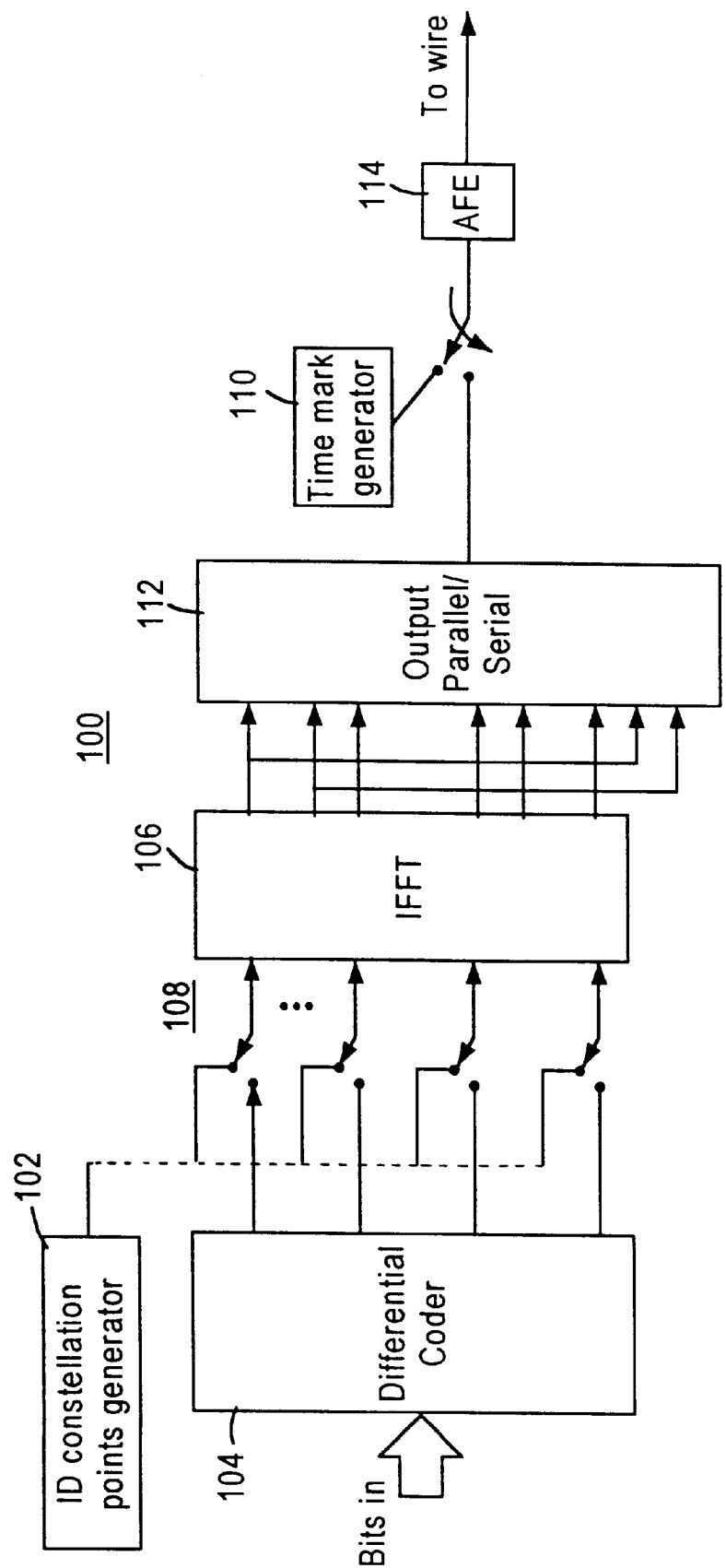
FIG. 2 is a diagram of a transmitter in a DMT communication station of the present invention.
Figure 3:
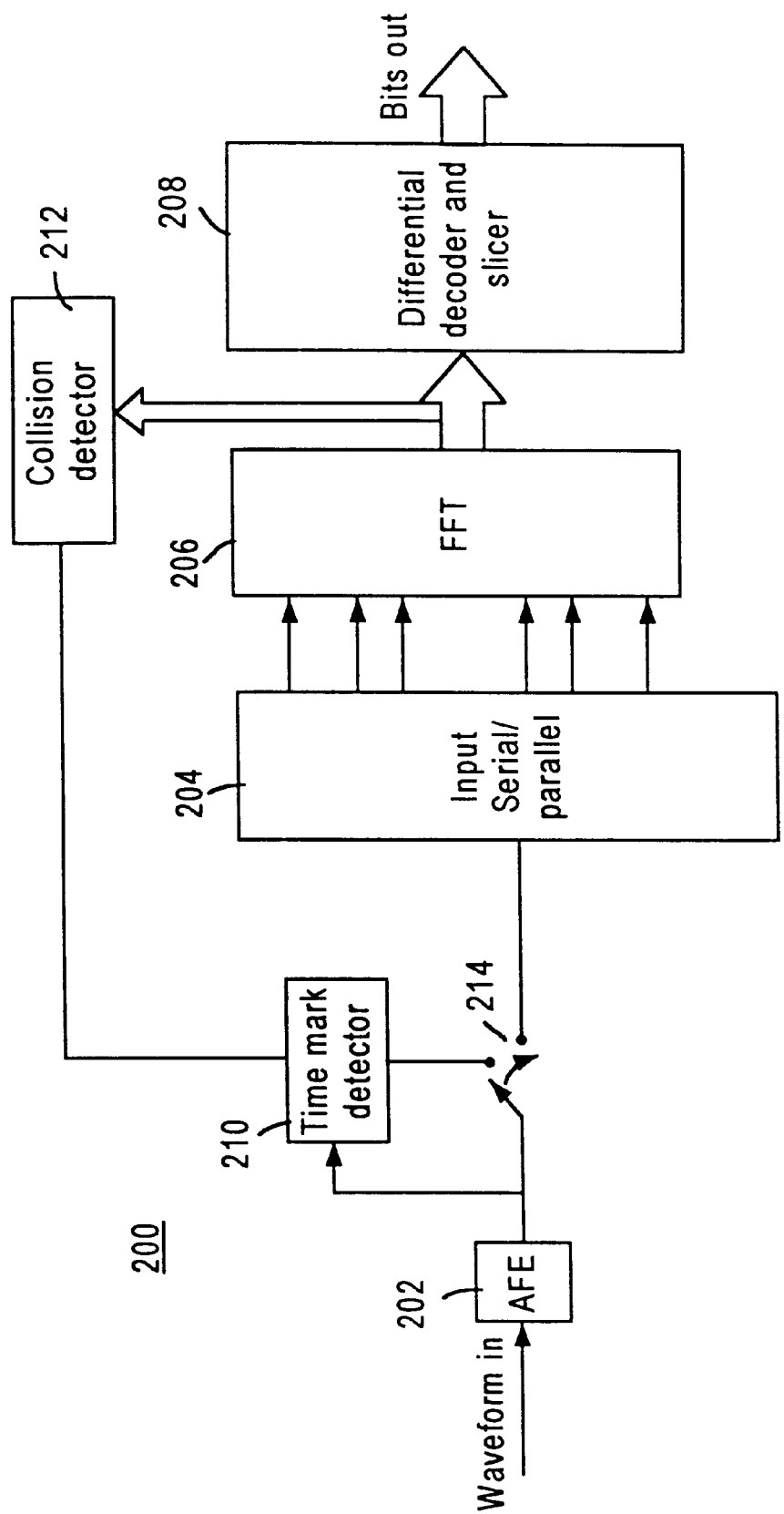
FIG. 3 is a diagram of a receiver in the DMT communication station of the present invention.

FIG. 2 provides a simplified block diagram of the functional elements of a DMT transmitter, and FIG. 3 provides a simplified block diagram of the functional elements of a DMT receiver for use in the PHY transceivers 22 of the network 10 (FIG. 1).

A transmitter circuit 100 communicates with a receiver circuit 200 over a physical link, in our example the wire 14, 31 (FIG. 1). In the implementation of a DMT PHY transceiver 22, both transmitter circuit 100 and receiver circuit 200 reside on a single printed circuit board. Typically, two DMT transceivers 12 and/or 34 are involved in any communication session across the link 14. For purposes of explanation, FIG. 2 simply shows the transmitter circuit 100 of one transceiver for sending data signals to the receiver elements 200 (FIG. 3) of the second transceiver.

To support a collision detection technique of the present invention, the transmitter 100 comprises an identification (ID) constellation points generator 102 that maps ID information of the transmitting station to unique ID points on the complex plane (i.e., ID constellation points). The ID constellation points generator 102 receives an n-bit ID value, and generates m constellation points, each of which represents either binary 1 or binary 0. For example, binary 0 may be mapped to the origin of the complex plane, and binary 1 may be mapped to a predetermined point on the complex plane. The operation of the constellation points generator 102 will be discussed in more detail later.

The transmitter 100 also comprises a differential encoder 104 that receives a digital data bit stream from a digital source, for example a host central processing unit (CPU). The data bit stream enters the differential encoder 102 as a serial input. The preferred embodiment uses a form of quadrature phase-shift keying type modulation (QPSK). The QPSK modulation technique essentially modulates two bits onto each modulated tone. As such, there are only four points in the constellation. Preferably, the DMT communications utilize a differential modulation technique. For example, if QPSK is used, the transmitter would generate the tone signal corresponding to a difference in phase representing the constellation point (2-bits of information).

The encoder 102 maps data bit sequences of the serial stream to points on the complex plane. However, unlike QPSK, the differential encoder 63 encodes the difference between a current constellation point with a reference constellation point.

For ease of discussion, the following description assumes differential quadrature phase-shift keying type modulation (DQPSK). Because of the relatively short distances involved in communication over in-home wiring, typically all 256 tones provide adequate transport for the DQPSK modulated signals. However, it is within the scope of the invention to vary the modulation and thus the number of bits modulated onto each tone and/or to vary the number of tones utilized in a particular installation or even during a particular communication session. For example, there may be installations were certain tones are unusable, due to noise or poor line characteristics. In another installation, all tones may be usable, but some can carry differential QAM modulation for various numbers of bits up to 15 bits, but other tones provide only adequate transport for the 2-bit DQPSK. Where the number of tones and/or the modulation and bit rates of the tones may vary from some set standard, the terminals on the line would periodically execute a "training" routine to determine the performance of each tone channel and appropriately set the modulation characteristics for each tone.

The outputs of the ID constellation points generator 102 and the differential encoder 104 are parallel arrays of complex numbers representing phase and amplitude information for each fundamental tone frequency, i.e. expressed in frequency domain values. These numbers are input in a parallel manner into an Inverse Fast Fourier Transform (IFFT) logic circuit 106.

Figure 4:
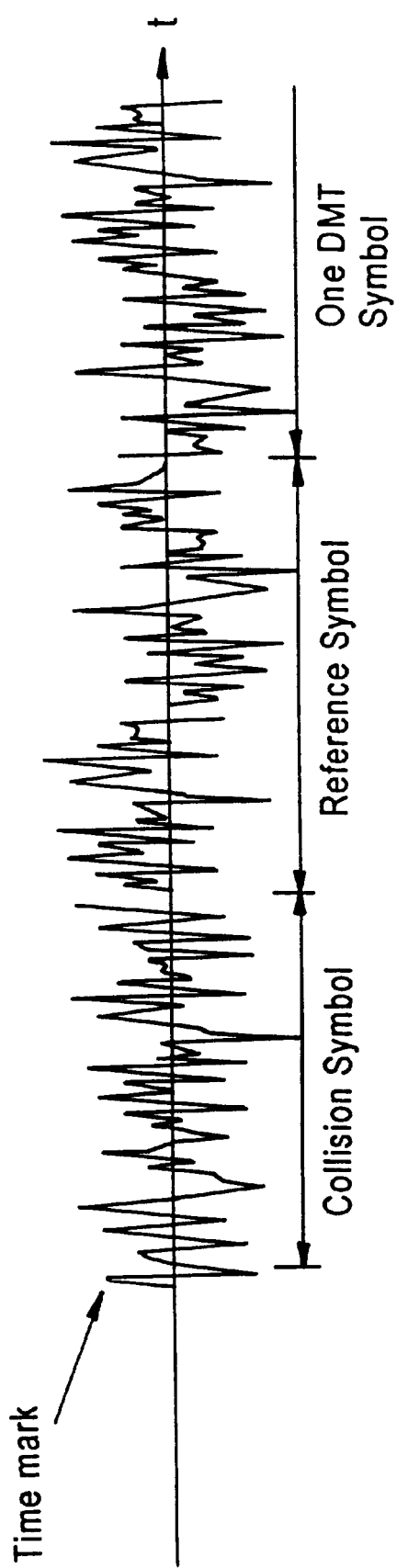
FIG. 4 is a timing diagram of a transmitted waveform.

A switching circuit 108 is provided for connecting either the ID constellation points generator 102 or the differential encoder 102 to the IFFT 106. The switching circuit 108 is controlled by a station generator that provides timing of transmission. In particular, as shown in FIG. 4, every packet transmitted over the line begins with a time mark produced by a time mark generator 110. The time mark may consist of one or more cycles of a sinusoidal waveform. When a sending station is attempting to seize the line, the transmitter 100 sends a DMT collision symbol immediately following the timing mark. The collision symbol produced based on the output of the ID constellation points generator 102 represents an ID information of the sending station. The collision station is followed by a DMT reference symbol and a DMT data symbol produced based on the output of the differential encoder 104. The reference symbol is a predefined DMT symbol used to assess the channel phase shift. The DMT data symbol represents the digital data stream supplied to the differential encoder 104. Thus, the switching circuit 108 connects the output of the ID constellation points generator 102 to the IFFT logic 106 when the collision symbol should be transmitted, and connects the output of the differential encoder 104 to the IFFR logic 106 when the reference symbol and the data symbols should be sent over the line. Also, the time mark generator 110 is coupled to the line when the time mark should be transmitted.

The IFFT logic 106 converts the complete set of numbers from the frequency domain into time-domain samples, which are then supplied to an output parallel-to-serial logic 112.

The analog signal for symbol comprises a complex waveform. Any waveform can be mathematically expressed as a sum of sinusoidal waveforms of various frequencies, phases and amplitudes. The waveform of DMT symbols are essentially corresponds to the sum of the tone signals used for the communication, at their respective frequencies and having at least different phases determined by the data modulated on the respective tones. The tone signals may also vary in amplitude as a function of additional bits of data. The time-domain samples output by the logic 112 represents the waveform as a series of N digital samples.

The IFFT 106 also adds certain number of samples for the cyclic prefix code, before the first of the samples corresponding to the actual DMT waveform. The output tream from the parallel/serial logic circuit 112 therefore consists of the digital stream for a number of samples needed for one symbol, whether it is a collision symbol, a reference symbol or a data symbol.

An analog front end (AFE) circuit 114 processes the serial stream of samples. The AFE circuit 114 performs the digital to analog conversion (DAC) and related filtering and/or other processing of the signal. The analog output signal takes a form similar to the example shown in FIG. 4, including a DMT collision symbol and several symbols containing the differentially encoded tone signals. The AFE 114 sends the analog waveform over the link to the receiver circuitry 200 at one or more of the other transceivers on the network 10.

The receiver 200 receives the analog signal using an AFE circuit 202, which mirrors some functions of the AFE 114 in the transmitter 100. For example, the AFE 202 is responsible for filtering the analog waveform and performing a digital to analog conversion ADC to obtain digital time-domain samples of the signal.

For symbol decoding, after processing of the received signal by the AFE 202, the digitized or discrete waveform samples are input to an input serial-to-parallel logic 204 for conversion to a parallel array of waveform samples. A Fast-Fourier-Transform (FFT) processor 206 converts the time domain information of the real numbers into frequency domain information, including frequency, phase and amplitude of various tones. A differential decoder and slicer 208 maps the frequency domain information into corresponding bit sequences to recreate the original data bit stream. In a DPSK system, the detected phase for each tone channel is compared to the phase for the channel detected during processing of a previous symbol. The decoder 208 essentially maps the differential phase information for each tone to a constellation and converts the constellation point to its corresponding bits of data. The bits of data derived from all of the channels of one symbol are combined into a serial bit stream.

The received analog waveform includes a time mark and a collision symbol waveform before the first data symbol. To process and detect these signals, the receiver 200 includes a time mark detector 210 and a collision detector 212. After a silent period when no transmitter has used the line, the time mark detector 210 monitors the samples of the line signal received from the AFE 202. Upon detection of a time mark, the detector 210 closes a switch 214 to pass subsequent samples. The detector 210 also provides an appropriate timing signal to the collision detector 212 coupled to the output of the FFT processor 206. As discussed in more detail later, the collision detector 212 processes the ID information encoded by the ID constellation points generator 102 to detect a collision event if two or more transmitters are trying to perform transmission simultaneously.

Returning to FIG. 2, the ID constellation points generator 212 first maps an n-bit ID of a transmitting station to one and only one m-bit collision code Ci, where m>n. Thereafter, the ID collision points generator 212 transforms each bit of the collision code Ci into a constellation point on the complex plane. In a preferred embodiment illustrated in FIG. 5, a 4-bit ID of the transmitter 100 may be mapped to a 6-bit collision code Ci, where i is an integral number between 0 and 15. For example, ID signal 0000 may be mapped to collision code 111000, and ID signal 0001 may be mapped to collision code 011100, etc.

A collision code Ci can be described by a descriptor Bi including a set of elements $b_1, b_2, b_3, \ldots, b_m$ indicating positions of binary ones in the collision code Ci. For example, as shown in FIG. 5, descriptor Bi represented by set $\{b_1, b_2, b_3\}$ indicates that the corresponding collision code Ci comprises binary 1 in the first, second and third bits; descriptor Bi represented by set $\{b_2, b_3, b_4\}$ indicates that the second, third and fourth bits of the corresponding collision code Ci have binary 1 values, etc.

In accord with the present invention, the collision code Ci must satisfy the following conditions. First, no set representing a descriptor Bi may be a subset of another descriptor Bj. For example, code Ci having descriptor Bi represented by set $\{b_1, b_2, b_3\}$ cannot be used as a collision code, if another collision code Cj has descriptor Bj represented by set $\{b_1, b_2, b_3, b_5, b_6\}$.

Second, no collision code Ci may have more than a preset number of adjacent binary zeroes. For example, none of collision codes Ci illustrated in FIG. 5 has more than 3 adjacent zeroes. The maximum allowed number of adjacent binary zeroes is selected based on the channel sampling rate, the FFT size and the channel characteristics.

Furthermore, in the preferred embodiment of the invention, each collision code Ci has a fixed number of binary ones. For example, each collision code Ci illustrated in FIG. 5 has 3 binary ones. As discussed later, such an arrangement simplifies collision detection performed on the receiving end. Longer IDs requiring longer collision codes can be divided into several groups of ID symbols, which may be mapped to several collision codes satisfying requirements of the mapping system. For example, IDs produced by media access control (MAC) devices may have 48 bits. Such IDs may be divided into 12 groups of 4-bit IDs, each of which may be mapped to one of collision codes Ci illustrated in FIG. 5.

The ID constellation points generator 102 transforms each bit of the collision code Ci into a constellation point on the complex plane. For example, binary 0 may be mapped to the origin of the complex plane. Binary 1 may be mapped to a predetermined point on the complex plane.

Thus, the ID constellation points generator 102 produces ID constellation points corresponding to the collision code Ci that represents the ID of the sending station. Each bit of the collision code is represented by one tone. The ID constellation points are output in parallel manner to the IFFT logic 106 that converts them from the frequency domain into N time-domain samples. The IFFT logic 106 also adds M samples for the cyclic prefix code before the N samples corresponding to the actual collision code. (N+M) samples representing a DMT collision symbol are supplied to the output parallel-to-serial converting logic 112 that serially output a digital stream of samples for the DMT collision symbol. The AFE 114 performs the digital to analog conversion of the samples to produce a DMT collision symbol having a number of tones representing the ID of the sending station.

In the receiver 200, the collision symbol is processed by the AFE 202, and the input serial-to-parallel converting logic 204 that produces a digital parallel array of N samples corresponding to the transmitted collision code Ci. The FFT processor 206 converts the time-domain information representing the collision code Ci into frequency-domain information, including phase and amplitude information of tones at different frequencies. Each tone represents a bit of the collision code Ci. The frequency-domain output of the FFT processor 206 is supplied to the collision detector 212 that processes the received tones to determine whether or not two or more station in the network perform transmission simultaneously.

Figure 6:
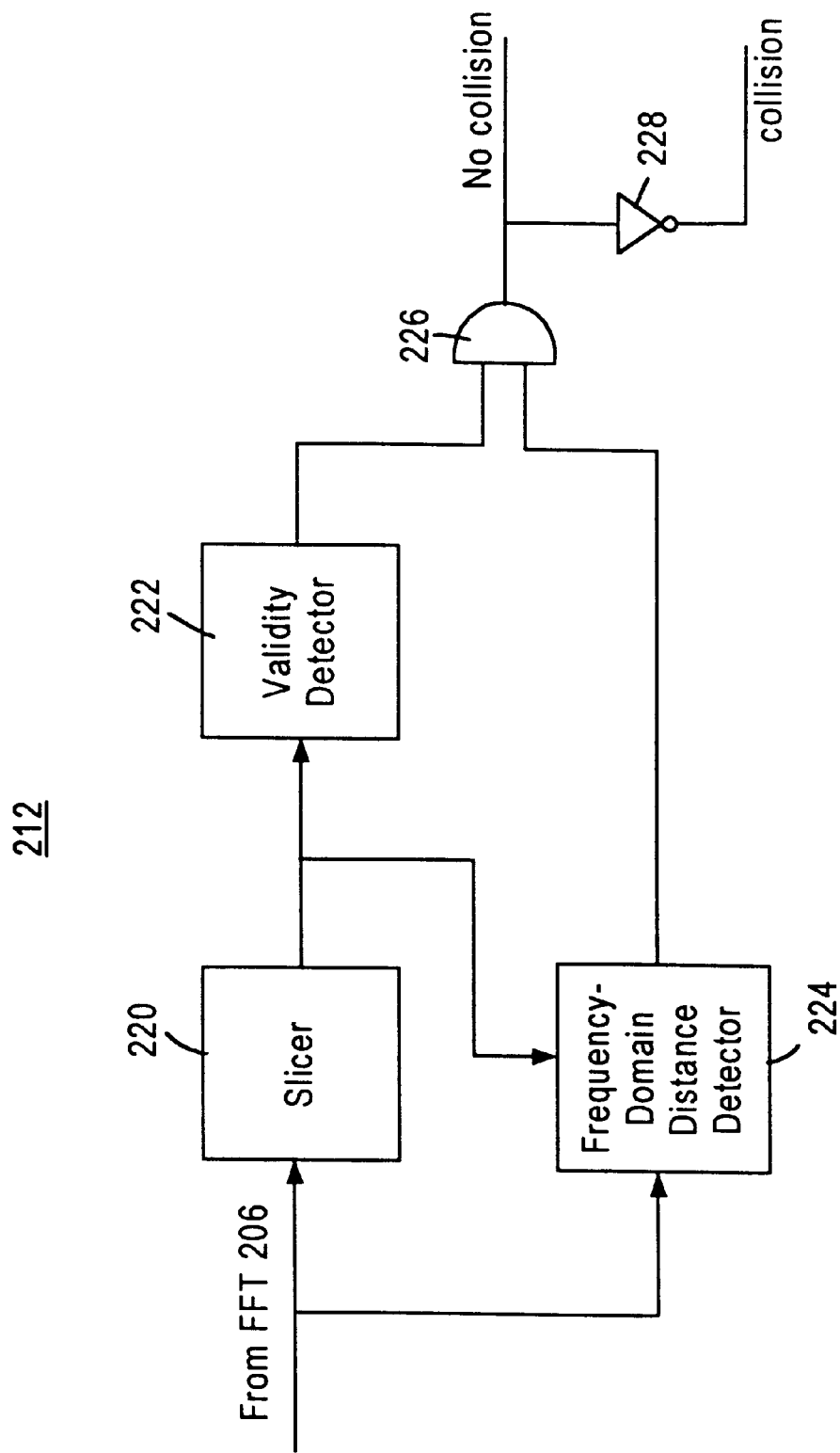
FIG. 6 is a diagram of a collision detector of the present invention.

Referring to FIG. 6, the collision detector 212 comprises a slicer 220, a validity detector 222, and a frequency-domain distance detector 224. The slicer 220 receives the frequency-domain collision signal from the output of the FFT processor 206 to compare energy of each tone of the received signal with a pre-set minimum energy. The slicer 220 outputs binary 1 for each tone having energy higher than the minimum energy, which, for example, may be established experimentally to distinguish between ones and zeroes in the collision code. Thus, binary ones at the output of the slicer 220 may correspond to ones in the transmitted collision code Ci. The slicer 220 outputs binary 0 for each tone, whose energy does not exceed the predetermined minimum energy level.

The validity detector 222 is used to determine whether a code produced at the output of the slicer 220 is a valid collision code. The validity detector 222 may implement any pre-set validity determination criteria. For example, the validity determination may be performed by counting the number of ones at the output of the slicer 220, if a collision code Ci has a predetermined fixed number of ones. If the number of ones counted by the validity detector 222 coincides with the predetermined number of ones in a collision code Ci, the validity detector produces binary 1. Thus, binary 1 at the output of the validity detector indicates that the code produced at the output of the slicer 220 is a valid collision code. If the validity detector 222 determines that the code is invalid, binary 0 is produced at its output.

The frequency-domain distance detector 224 receives the frequency-domain collision signal from the output of the FFT processor 206 and the binary ones from the output of the slicer 220. The frequency-domain distance detector 224 compare the distance in the frequency domain between a tone decoded by the slicer 220 as binary 1 ("binary 1 tone") and the next binary 1 tone, with a predetermined maximum distance in the frequency domain. The maximum frequency-domain distance may be established experimentally or theoretically.

The frequency-domain distance detector 224 performs the frequency-domain distance comparison for every tone decoded by the slicer 220 as binary 1. Binary 1 is produced at the output of the frequency-domain distance detector 224, if the frequency-domain distance between every binary 1 tone in a particular collision code and the next binary 1 tone is less than the predetermined maximum frequency-domain distance. If at least for one binary 1 tone in the collision code, the frequency-domain distance is not less than the predetermined maximum distance, the frequency-domain distance detector produces binary 0 at its output.

The outputs of the validity detector 222 and the frequency-domain distance detector 224 are connected to inputs of an AND gate 226. When binary ones are supplied to both inputs of the AND gate 226, a "no collision signal" is produced at the output, indicating than no collision is detected. However, when binary 0 is detected at least at one input of the AND gate 226, a collision detection signal is produced at the output of an inverter 228 connected to the AND gate 226.

The collision detection signal indicates that two or more network stations try to perform transmission simultaneously. In this case, collision symbols transmitted by different network stations overlap with each other. As a result, collision detectors 212 of all network stations detect a collision event. In response to the detection of a collision event, network stations may terminate transmission. As the collision symbol is send at the beginning of a transmission session before transmitting a data packet, the collision detection system of the present invention prevents a network station from transmitting the data packet, in order to avoid wasting network bandwidth.

Those skilled in the art will recognize that the present invention admits of a number of modifications, within the spirit and scope of the inventive concepts. For example, the DMT transmitter and the DMT receiver may be implemented in a number of different ways. These circuits in the transceivers may be implemented as specifically engineered chips having logic circuits and other components for performing the functions described above. Alternatively, one or both may be implemented using a general purpose digital signal processor and appropriate programming. Also, a number of different circuits or software procedures may be used for the ID constellation points generator and collision detector. For example, these units may rely on digital signal processing techniques.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. In a communication network having stations transmitting over common media, a method of detecting collision comprises the steps of:

(a) generating a collision code corresponding to ID information of a station, (b) transmitting a collision symbol representing the collision code at the beginning of a portion of a random access data communication, (c) receiving the collision symbol, (d) detecting a collision signal carried by the collision symbol, and (e) detecting a collision event if the collision signal does not satisfy pre-set requirements.

2. The method of claim 1, wherein the step e comprises the step of comparing energy of each component of the collision signal with a predetermined minimum energy level to generate a code element at a first logic level for each component having energy exceeding the predetermined minimum energy level.

3. The method of claim 2, wherein the step e further comprises determining validity of a detected code having code elements generated during the step of comparing energy, based on a predetermined validity criterion.

4. The method of claim 3, wherein the collision code has a predetermined number of the code elements at the first logic level.

5. The method of claim 4, wherein the validity of the detected code is determined based on counting of the number of the code elements at the first logic level.

6. The method of claim 3, wherein the step e further comprises comparing distance in frequency domain between components of the collision signal corresponding to the generated code elements at the first logic level, with a predetermined minimum distance in frequency domain, to confirm validity of the detected code.

7. The method of claim 6, wherein a no collision condition indicating than no collision exists is detected if the generated code is valid based on the predetermined validity criterion, and the distance in frequency domain between components of the collision signal corresponding to the generated code elements at the first logic level is less than the predetermined minimum distance in frequency domain.

8. The method of claim 1, wherein the collision code has a predetermined maximum number of adjacent elements at a second logic level.

9. The method of claim 1, wherein the collision code is described by a descriptor including a set of descriptor elements indicating positions of code elements at a first logic level.

10. The method of claim 9, wherein a first collision code is described by a first set of descriptor elements, which is not a subset of a second descriptor describing a second collision code.

11. A discrete multi-tone (DMT) communication station for use on an analog link carrying modulated digital data, comprising:

a collision code generator for generating a collision code corresponding to ID information of the station, a DMT modulator for producing a DMT collision symbol representing the collision code, a DMT demodulator for demodulating the DMT collision symbol received from the link to produce a collision signal, and a collision detector responsive to the collision signal for detecting a collision event if the collision signal does not satisfy pre-set requirements.

12. The station of claim 11, wherein the collision detector comprises a slicer responsive to the collision signal for comparing energy of each component of the collision signal with a predetermined minimum energy level to generate a code element at a first logic level for each component having energy exceeding the predetermined minimum energy level.

13. The station of claim 12, wherein the collision detector further comprises a validity detector coupled to the slicer for determining validity of a detected code having code elements generated by the slicer, based on a predetermined validity criterion.

14. The station of claim 13, wherein collision code generator generates the collision code having a predetermined number of the code elements at the first logic level.

15. The station of claim 14, wherein the validity detector determines validity of the detected code based on counting of the number of the code elements at the first logic level.

16. The station of claim 13, wherein the collision detector further comprises a frequency-domain distance detector for comparing distance in frequency domain between components of the collision signal corresponding to the generated code elements at the first logic level, with a predetermined minimum distance in frequency domain, to confirm validity of the detected code.

17. The station of claim 16, wherein the collision detector detects that no collision exists if the generated code is valid based on the predetermined validity criterion, and the distance in frequency domain between components of the collision signal corresponding to the generated code elements at the first logic level is less than the predetermined minimum distance in frequency domain.

18. The station of claim 11, wherein the collision code generator generates the collision code having a predetermined maximum number of adjacent elements at a second logic level.

19. The station of claim 11, wherein the collision code detector generates the collision code described by a first descriptor including a first set of descriptor elements indicating positions of code elements at a first logic level.

20. The station of claim 19, wherein the collision code generator generate the collision code described by the first set of descriptor elements, which is not a subset of a second descriptor describing another collision code.

* * * * *